United States Patent
Browne

[11] 4,300,669
[45] Nov. 17, 1981

[54] CUSHION FINGER DIAPHRAGM SPRING CLUTCH

[75] Inventor: Vance D. Browne, Arlington Heights, Ill.

[73] Assignee: Borg-Warner Corporation, Chicago, Ill.

[21] Appl. No.: 84,497

[22] Filed: Oct. 15, 1979

[51] Int. Cl.³ .............................................. F16D 13/71
[52] U.S. Cl. .................................. 192/89 B; 267/161; 192/109 A
[58] Field of Search ................ 192/89 B, 99 A, 89 R, 192/109 R, 109 A; 267/161

[56] References Cited

U.S. PATENT DOCUMENTS

| | | |
|---|---|---|
| 1,492,862 | 5/1924 | Smith . |
| 3,107,766 | 10/1963 | Pritchard . |
| 3,174,602 | 3/1965 | Schjolin . |
| 3,323,624 | 6/1967 | Maurice . |
| 3,785,466 | 1/1974 | Murai et al. |
| 3,811,544 | 5/1974 | Maucher . |
| 3,834,501 | 9/1974 | Adachi . |
| 3,868,099 | 2/1975 | Maucher et al. ................ 267/161 |
| 3,933,230 | 1/1976 | Adachi . |

FOREIGN PATENT DOCUMENTS 1027999 4/1958 Fed. Rep. of Germany .... 192/89 B
1475254 12/1968 Fed. Rep. of Germany ...... 267/161

Primary Examiner—George H. Krizmanich
Attorney, Agent, or Firm—James A. Geppert

[57] ABSTRACT

A diaphragm spring-type clutch assembly for an automotive vehicle or similar application wherein the diaphragm spring includes a plurality of outwardly extending integral cushion fingers on the periphery of the spring disc and arranged at such an angle as to engage the pressure plate of the clutch before the spring engages the fulcrum surface on the pressure plate as the clutch is engaged and thus cushion the engagement of the clutch.

6 Claims, 3 Drawing Figures

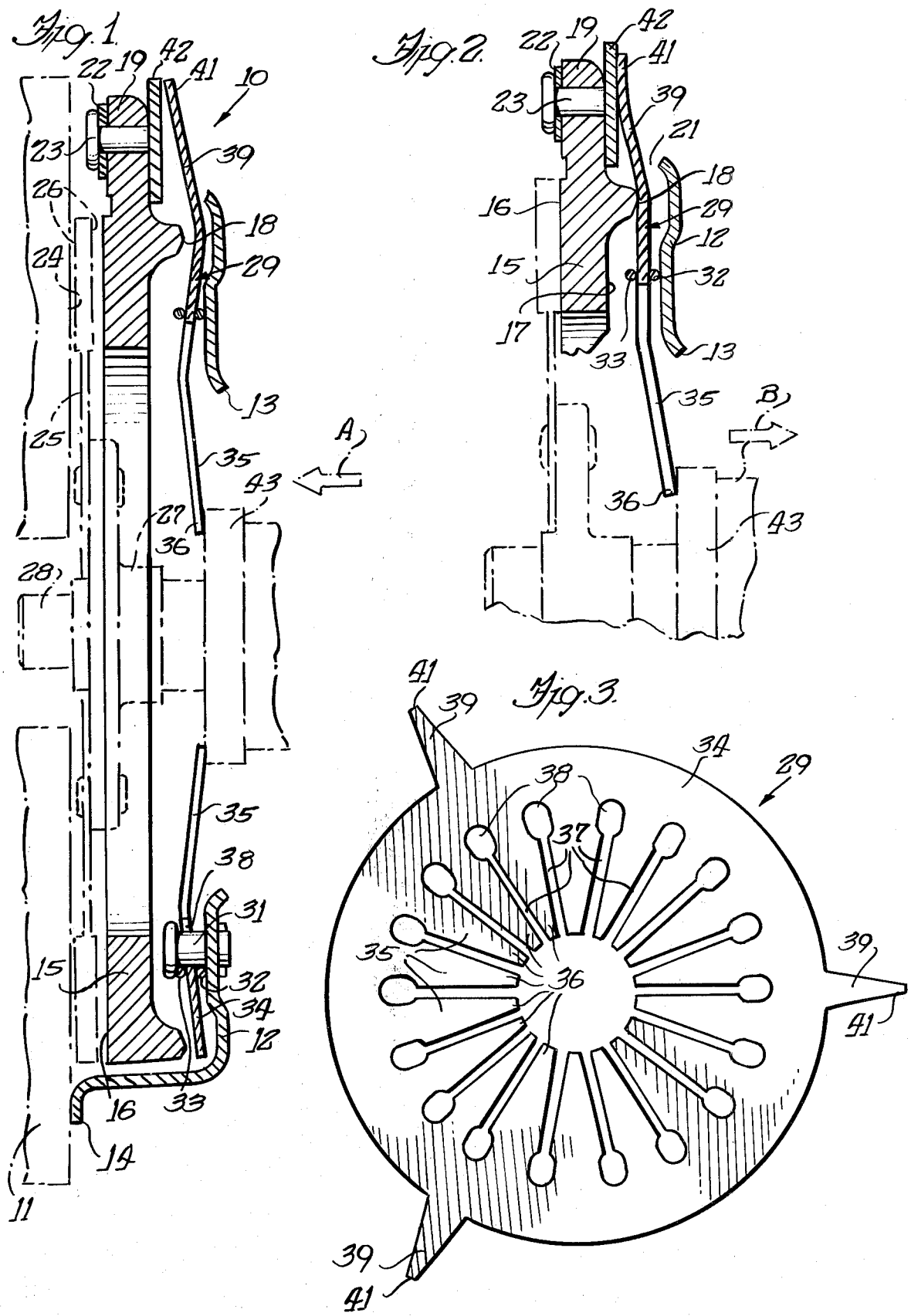

CUSHION FINGER DIAPHRAGM SPRING CLUTCH

BACKGROUND OF THE INVENTION

In a conventional clutch for automotive vehicles or similar applications, a clutch disc having friction faces on the opposite surfaces thereof is engaged by a flywheel driven by the vehicle engine and a pressure plate rotatably connected to and axially movable toward and away from the flywheel; the clutch disc being connected to a transmission input shaft leading to the vehicle transmission. Depending upon the rate of release of the clutch pedal by the vehicle operator, the disengaged clutch plate could be suddenly grabbed by the rotating flywheel and pressure plate resulting in a sudden shock to the clutch plate which does not provide a smooth ride for the vehicle and seriously reduces the effective life of the clutch.

To avoid this grabbing action, a cushioning effect is required to provide a smooth clutch engagement resulting in a steady and progressive action from the initial point of clutch engagement to the point where all slip ceases. Early efforts to provide this cushion effect included a series of springs riveted between the friction facings of the clutch disc to bias the facings axially outwardly. Other versions have included one or more cushioning springs mounted in the fulcrum edge on the pressure plate. However, all of these versions require additional parts and assembly operations. The present invention obviates the problems of the previous cushioning structures and provides a simplified clutch arrangement.

SUMMARY OF THE INVENTION

The present invention relates to an effective cushioning means for a diaphragm spring-type friction clutch which eliminates the use of separate springs to provide the cushioning effect. The cushioning means is accomplished by a new configuration of diaphragm or Belleville spring wherein a plurality of circumferentially equally spaced outwardly extending spring fingers are formed on the outer periphery of the spring and oriented so that the ends of the fingers engage the pressure plate prior to engagement of the spring body with the fulcrum edge or surface projecting from the pressure plate. Engagement and gradual deformation of the peripheral fingers on the pressure plate as the clutch is engaged provides the cushioning necessary to prevent a sudden grabbing of the clutch between the pressure plate and flywheel.

The present invention also comprehends the provision of a diaphragm spring-type clutch having cushioning means that requires substantially no modification of the clutch structure. Other than the modification of the diaphragm spring to provide the integral spring fingers, the only other addition is in the provision of wear plate extensions secured to the pressure plate to be engaged by the cushioning fingers.

Further objects are to provide a construction of maximum simplicity, efficiency, economy and ease of assembly and operation, and such further objects, advantages and capabilities as will later more fully appear and are inherently possessed thereby.

DESCRIPTION OF THE DRAWING

FIG. 1 is a partial cross sectional view of a vehicle friction clutch showing the present invention therein with the clutch in disengaged position.

FIG. 2 is a partial cross sectional view similar to FIG. 1 but showing the clutch in engaged position.

FIG. 3 is a rear elevational view of the diaphragm spring with the integral cushioning fingers.

DESCRIPTION OF THE PREFERRED EMBODIMENT

Referring more particularly to the disclosure in the drawing wherein is shown an illustrative embodiment of the present invention, FIG. 1 discloses a partial showing of a vehicle clutch assembly 10 including a flywheel 11 driven by the rotating shaft of a vehicle engine (not shown), and a clutch cover 12 having a central opening 13 and an interrupted peripheral flange 14 secured to the flywheel by suitable means such as bolts (not shown). An annular pressure plate 15 has a friction surface 16 facing the flywheel and an annular fulcrum surface or edge 18 projecting from the opposite surface 17 facing the cover. The pressure plate is provided with three or more circumferentially equally spaced lugs 19 formed on the periphery thereof and extending through openings 21 formed in the cover. Drive straps 22 have one end secured to the lugs 19 by rivets 23 or other suitable securing means and the opposite end secured to the cover, so that the flywheel, cover and pressure plate rotate simultaneously.

The flywheel 11 also has a friction surface 24 facing the surface 16, and between these surfaces are positioned the opposed friction facings 26,26 of a clutch disc 25 mounted on a hub 27 operatively connected to a transmission input shaft 28 extending rearwardly through the opening 13 of the clutch cover 12 to the vehicle transmission. To urge the pressure plate 15 to move axially toward the flywheel 11, a diaphragm or Belleville spring 29 is mounted for pivotal movement on the clutch cover 12 by several shoulder rivets 31. The rivets 31 are secured in the cover and support a pair of wire rings or loops 32,33 positioned on the opposite surfaces of the spring 29.

The diaphragm spring 29 includes a conical outer portion 34 having a plurality of inwardly extending spring fingers 35 terminating at release bearing engaging ends 36; the fingers being formed by radially extending slots 37 terminating at their outer ends in enlarged openings 38. As seen in FIG. 1, the shoulder rivets 31 extend through enlarged openings 38 in the spring 29 and project through the cover to be secured therein. At the outer periphery of the spring 29 are three circumferentially spaced integral cushion fingers 39 oriented at an angle downwardly from the normal conical configuration of the spring to extend beyond the fulcrum surface 18 with the outer ends 41 of the tapered fingers engaging wear plates 42 positioned on the lugs 19 and secured thereto by the rivets 23.

Considering the operation of a convention diaphragm spring-actuated clutch, FIG. 1 discloses the clutch assembly 10 in a disengaged condition due to movement of a release bearing 43 in the direction of the arrow A to force the spring fingers 35 to the left and pivot the diaphragm spring around the wire loop 33 so that the spring is out of contact with the fulcrum surface 18. Without the cushioning fingers, when the release bearing 43 moves in the direction of the arrow B, the diaphragm spring pivots around the wire loop 32 until it engages the fulcrum surface 18 to urge the pressure plate 15 towards the flywheel 11 to engage the clutch disc 25. Small movements of the diaphragm spring adjacent the outer periphery generate large forces at the fulcrum surface 18 which will cause a rough and sudden engagement of the clutch disc.

With the addition of the cushioning fingers 39, the rough engagement is obviated because the fingers act as cantilever springs. As seen in FIG. 1, when the clutch is disengaged, the ends 41 of the fingers 39 barely contact the wear plates 42 on the pressure plate lugs 19. During the engagement process, as shown in FIG. 2, as the spring fingers 35 move in the direction of the arrow B, the cushion fingers 39 contact the wear plates 42 to exert a cushion force on the pressure plate 15. Continued movement of the spring fingers 35 causes the cushioning fingers 39 to deflect and apply an increasing cushion force until the diaphragm spring 29 contacts the fulcrum surface 18 to apply the primary force and complete the engagement process.

I claim:

1. In a vehicle clutch having a cover secured to a flywheel, a clutch disc and an axially reciprocable pressure plate within the cover, the pressure plate adapted to engage the clutch disc with the flywheel and having a generally annular fulcrum surface engageable by a diaphragm spring pivotally mounted in said cover, the improvement comprising a plurality of circumferentially equally spaced cushioning fingers integral with and located on the periphery of the diaphragm spring, the cushioning fingers adapted to extend outwardly beyond the fulcrum surface and engage the pressure plate prior to engagement of the spring with the fulcrum surface to cushion the engagement of the clutch.

2. A vehicle clutch as set forth in claim 1, in which said cushioning fingers are outwardly tapered.

3. In a vehicle clutch having a cover secured to a flywheel, a clutch disc and an axially reciprocable pressure plate within the cover, the pressure plate adapted to engage the clutch disc with the flywheel and having a fulcrum surface engageable by a diaphragm spring pivotally mounted in said cover, the improvement comprising a plurality of circumferentially equally spaced cushioning fingers integral with and located on the periphery of the diaphragm spring, said pressure plate including a plurality of drive lugs corresponding to the number of cushioning fingers and extending generally radially beyond the fulcrum surface, said cushioning fingers engaging said lugs prior to engagement of the diaphragm spring with said fulcrum surface to cushion the engagement of the clutch.

4. A vehicle clutch as set forth in claim 3, including a wear plate secured to each drive lug and contacted by a cushioning finger.

5. In a vehicle clutch having a cover secured to a flywheel, a clutch disc and an axially reciprocable pressure plate within the cover, the pressure plate adapted to engage the clutch disc with the flywheel and having a fulcrum surface engageable by a diaphragm spring pivotally mounted in said cover, said diaphragm spring having a conical body portion with inwardly extending spring fingers, the improvement comprising a plurality of circumferentially equally spaced cushioning fingers integral with and located on the periphery of the diaphragm spring, said cushioning fingers being oriented at an angle to the conical body portion so that the angle of the cushioning fingers to the axis of the spring is less than the angle of the conical body portion to the spring axis, the cushioning fingers adapted to engage the pressure plate prior to engagement of the spring with the fulcrum surface to cushion the engagement of the clutch.

6. In a vehicle clutch having a cover secured to a flywheel, a clutch disc and an axially reciprocable pressure plate within the cover, the pressure plate adapted to engage the clutch disc with the flywheel and having a fulcrum surface engageable by a diaphragm spring pivotally mounted in said cover, the improvement comprising a plurality of circumferentially equally spaced cushioning fingers integral with and located on the periphery of the diaphragm spring, the tips of the cushioning fingers contacting the pressure plate when the clutch is disengaged and, when the clutch is engaged, the fingers are gradually deformed to cushion the clutch until the diaphragm spring body engages the fulcrum surface and continues the engagement of the clutch.

* * * * *